US009452737B2

(12) United States Patent
Bratec et al.

(10) Patent No.: US 9,452,737 B2
(45) Date of Patent: Sep. 27, 2016

(54) WIPER CONNECTING UNIT

(75) Inventors: Hervé Bratec, Wilsele (BE); Guido Tuyls, Bunsbeek (BE); Robert Vertongen, Heusden-Zolder (BE)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 13/704,680

(22) PCT Filed: Apr. 19, 2011

(86) PCT No.: PCT/EP2011/056186
§ 371 (c)(1),
(2), (4) Date: Dec. 17, 2012

(87) PCT Pub. No.: WO2011/157465
PCT Pub. Date: Dec. 22, 2011

(65) Prior Publication Data
US 2013/0086767 A1    Apr. 11, 2013

(30) Foreign Application Priority Data

Jun. 16, 2010  (DE) .................. 10 2010 030 142

(51) Int. Cl.
*B60S 1/38* (2006.01)
*B60S 1/40* (2006.01)
*B60S 1/04* (2006.01)

(52) U.S. Cl.
CPC .............. *B60S 1/40* (2013.01); *B60S 1/0408* (2013.01); *B60S 1/381* (2013.01); *B60S 1/4048* (2013.01); *B60S 1/3856* (2013.01); *B60S 1/3879* (2013.01); *B60S 1/3886* (2013.01)

(58) Field of Classification Search
CPC ...... B60S 1/3849; B60S 1/3863; B60S 1/40; B60S 1/3806; B60S 1/3808; B60S 1/381
See application file for complete search history.

(56) References Cited

U.S. PATENT DOCUMENTS

| 8,397,341 B2* | 3/2013 | Ehde .................. B60S 1/4038 15/250.32 |
| 2006/0021178 A1 | 2/2006 | Verelst et al. |
| 2008/0078051 A1* | 4/2008 | Herring ............... B60S 1/3851 15/250.001 |

FOREIGN PATENT DOCUMENTS

| DE | 10323997 | 6/2004 |
| DE | 202005008673 | 11/2005 |
| WO | 2007/033827 | 3/2007 |
| WO | 2010044768 | 4/2010 |
| WO | 2010/094513 | 8/2010 |

OTHER PUBLICATIONS

International Search Report for Application No. PCT/EP2011/056186 dated Jul. 19, 2011 (English Translation and Original, 6 pages).

* cited by examiner

*Primary Examiner* — Monica Carter
*Assistant Examiner* — Stephanie Berry
(74) *Attorney, Agent, or Firm* — Michael Best & Friedrich LLP

(57) ABSTRACT

The invention is based on a wiper connecting unit with a basic body (12) for connecting a wiper blade adapter (14) to a wiper arm (16) of a wiper. It is proposed that the basic body (12) has a spoiler receiving region (20) arranged on one side (18) of the wiper arm.

15 Claims, 3 Drawing Sheets

WIPER CONNECTING UNIT

BACKGROUND OF THE INVENTION

Wiper connecting units with a basic body for connecting a wiper blade adaptor to a wiper arm of a wiper are already known.

SUMMARY OF THE INVENTION

The invention is based on a wiper connecting unit with a basic body for connecting a wiper blade adaptor to a wiper arm of a wiper.

It is proposed that the basic body has a spoiler receiving region arranged on one wiper arm side. In this connection, "a basic body" is intended to be understood as meaning a component of the wiper connecting unit, which component has at least one coupling region, in particular with a form-fitting element, for coupling to the wiper arm and is essentially provided for transmitting forces and/or moments for producing a wiping movement from the wiper arm to the wiper blade adaptor during the operation of the wiper. A "wiper blade adaptor" is intended to be understood here in particular as meaning a component of the wiper, in particular of the wiper blade, which is provided for connecting spring rails for prestressing a wiper blade rubber of the wiper to the wiper blade rubber. The spring rails are held in groove-shaped recesses in the wiper blade rubber, preferably by means of hook-shaped fastening elements of the wiper blade adaptor. The term "wiper arm" is intended here to define in particular a component of the wiper, which component is provided, by means of a joint-free or articulated connection to a fastening hub, fastenable to a drive shaft, for producing a reciprocating wiping movement of the wiper blade, in particular of the wiper blade rubber, on a window, in particular a windscreen of a motor vehicle. In this connection the wiper arm comprises at least one wiper rod to which the wiper blade of the wiper is couplable by means of the wiper connecting unit. Here, "one wiper arm side" is intended to be understood in particular as meaning a side of the basic body, which side, after connection of the wiper connecting unit to the wiper arm, faces the wiper arm, as viewed in a longitudinal direction of the basic body. An extension of the wiper arm side of the basic body is limited by two opposite side walls of the basic body, said side walls running at least substantially parallel to the longitudinal direction of the basic body. Here, "substantially parallel walls" are intended in particular to be understood as meaning that, starting from a longitudinal orientation predetermined by one of the walls, the other wall has a longitudinal orientation which deviates by less than 5° and preferably less than 2° from the predetermined longitudinal orientation. The basic body has a maximum extension along the longitudinal direction of the basic body, with reference to a section running at least substantially parallel to the opposite side walls.

A "spoiler receiving region" is intended in particular to define an edge region and a basic body space bounded by the edge region, which edge region and space are provided for at least partially receiving a spoiler unit of the wiper, in particular of the wiper blade, such that the spoiler unit, in particular a spoiler unit region facing the basic body, is at least partially surrounded by the basic body, in particular the edge region, in a fitted state of the wiper connecting unit, and is arranged in the space bounded by the edge region. The edge region of the spoiler receiving region advantageously has a shape corresponding to an outer contour of the spoiler unit. The edge region of the spoiler receiving region is particularly preferably at least partially curved, as viewed in a plane perpendicular to the longitudinal direction of the basic body, and is preferably of at least substantially S-shaped design. Here, "substantially S-shaped" is intended in particular as meaning a shape which comprises at least two consecutive arcs running in a plane and each being oppositely oriented to each other. In a fitted state of the wiper connecting unit, the outer contour of the spoiler unit, in particular an outer contour region facing the spoiler receiving region, preferably engages in the space bounded by the edge region of the spoiler receiving region, in a manner bearing at least in a substantially form-fitting manner against the edge region. "Substantially in a form-fitting manner" is intended in particular as meaning reception of the spoiler unit in that space of the spoiler receiving region which is bounded by the edge region, at least one spoiler unit region facing the spoiler receiving region fills that space of the spoiler receiving region which is bounded by the edge region apart from a tolerance-induced play and/or at least to 80% and/or bears directly against an inside of the edge region of the spoiler receiving region. In this connection, "provided" is intended to be understood in particular as meaning specially equipped and/or specially designed. By means of the configuration according to the invention of the wiper connecting unit, the spoiler unit can be received in a structurally simple manner, thus making it possible for fluid to approach the spoiler unit in an advantageous manner. In addition, it is particularly advantageously possible to prevent what is referred to as "overspray" during operation of the wiper.

Furthermore, it is proposed that the basic body has a first fluid-retaining element which is at least partially adjacent to the spoiler receiving region transversely with respect to a longitudinal direction of the basic body. In this case, a "fluid-retaining element" is intended to be understood as meaning an element which, by means of a special shape and/or by means of a special surface structure and/or by means of a special interaction with a further component, is provided specifically for avoiding entry of a fluid flow into a component and/or exit of a fluid flow from a component, and/or limiting said entry or exit to a minimum. The first fluid-retaining element is particularly preferably provided for avoiding or limiting a fluid flow through the wiper connecting unit and exits on a wiper blade side which faces away from a wiper blade main approach flow side, in particular the spoiler unit of the wiper blade.

The first fluid-retaining element is particularly preferably of curved design starting from the spoiler receiving region, as viewed from a top side of the basic body. A "top side" is intended here as meaning in particular a basic body side which, in a fitted state of the wiper connecting unit, faces away from the wiper blade and in an extension is bounded at least by the wiper arm side and/or the two opposite side walls running at least substantially parallel to the longitudinal direction of the basic body. The term "curved" is intended in particular as meaning a geometrical shape which, as viewed in a plane, is designed in the form of a circular arc or has at least one radius along an overall extension. However, it is also conceivable for the first fluid-retaining element to have a different shape appearing expedient to a person skilled in the art. By means of the configuration according to the invention of the wiper connecting unit, an emerging of the fluid flow on a wiper connecting unit side facing away from the wiper blade main approach flow side can be particularly advantageously countered.

Furthermore, it is proposed that the basic body has a second fluid-retaining element which adjoins the first fluid-retaining element, is arranged on a side facing away from a top side of the basic body and extends with at least one component, which extends perpendicularly to a side wall, into an inner region of the basic body. The first fluid-retaining element is particularly preferably at least partially formed integrally with the second fluid-retaining element. An "inner region" is intended here to be understood in particular as meaning a region, in particular a space, which is surrounded at least by the wiper arm side, by the top side and by the two opposite side walls running at least substantially parallel to the longitudinal direction of the basic body. A "component of the second fluid-retaining element" is intended to be understood here, in particular as meaning a vectorial component, in particular a position vector which is provided for defining the second fluid-retaining element in a two-dimensional Cartesian system of coordinates, as, for example, for the definition of an extension of the second fluid-retaining element. It is possible in a structurally simple manner to achieve a compact wiper connecting unit by means of which effective protection against "overspray" can be achieved.

The basic body advantageously has a bearing receptacle which is provided for receiving a bearing element for the pivotable mounting of the basic body relative to the wiper blade adaptor. By this means, a pivoting movement can advantageously be realized between the basic body and the wiper blade rubber, in particular the fitted wiper blade adapter, and therefore, for example, the wiper blade rubber can be pivoted relative to the basic body when changing a wiper blade.

Furthermore, the invention is based on a wiper blade with at least one spoiler unit, with a wiper blade adapter which is at least partially arranged in a recess of the spoiler unit, and with a wiper connecting unit.

It is proposed that the wiper connecting unit overlaps a side of the spoiler unit that faces away from a wiper blade main approach flow side, at least on one wiper arm side. The term "overlap" is intended here in particular as defining that, in the fitted state, the wiper connecting unit, in particular the basic body, covers the spoiler unit, as viewed from that side of the wiper blade that faces away from the wiper blade main approach flow side, at least on the wiper arm side of the basic body, in a plane perpendicular to the longitudinal direction of the basic body. An extension of the recess running along a longitudinal direction of the wiper blade is preferably smaller than an extension of the basic body running along the longitudinal direction of the wiper blade. By means of the configuration according to the invention, a fluid flow between that side of the wiper blade facing the wiper blade main approach flow side, in particular of the spoiler unit, and that side of the wiper blade which faces away from the wiper blade main approach flow side, in particular of the spoiler unit, can advantageously be very substantially prevented by the wiper connecting unit.

Furthermore, it is proposed that at least the first fluid-retaining element and the second fluid-retaining element of the basic body of the wiper connecting unit bear in an at least partially sealing manner against that side of the spoiler unit which faces away from the wiper blade main approach flow side. Here, "bear in a sealing manner" is intended to be understood in particular as meaning bearing of the first fluid-retaining element and of the second fluid-retaining element against that side of the spoiler unit which faces away from the wiper blade main approach flow side, wherein in particular a tolerance-induced, distance between the first fluid-retaining element or the second fluid-retaining element and the spoiler unit is smaller than 2 mm, preferably smaller than 1 mm and particularly preferably smaller than 0.05 mm. The spoiler unit is advantageously pressed by means of an air flow impinging on the spoiler unit, for example a relative wind, in the direction of the first fluid-retaining element and of the second fluid-retaining element during operation such that the spoiler unit bears directly against the first fluid-retaining element and the second fluid-retaining element at least during operation. This makes it advantageously possible at least substantially to avoid water exiting between the spoiler unit and the first fluid-retaining element or the second fluid-retaining element.

In an advantageous manner, the basic body has a fluid-retaining element which, as viewed from a top side of a basic body of the wiper connecting unit, encloses an angle not equal to 90° to a side wall of the basic body. That side wall of the basic body which faces the wiper blade main approach flow side and the fluid-retaining element particularly preferably enclose an acute angle. However, it is also conceivable for the side wall of the basic body and the fluid-retaining element to enclose an angle deviating from an acute angle. By means of the configuration according to the invention, entry of a fluid flow into the inner region of the basic body along the longitudinal direction of the basic body can advantageously be countered.

BRIEF DESCRIPTION OF THE DRAWINGS

Further advantages emerge from the following description of the drawing. The drawing illustrates an exemplary embodiment of the invention. The drawing, the description and the claims contain numerous features in combination. A person skilled in the art will expediently also consider the features individually and combine them to form meaningful further combinations.

In the drawing.

DETAILED DESCRIPTION

Figure 1:
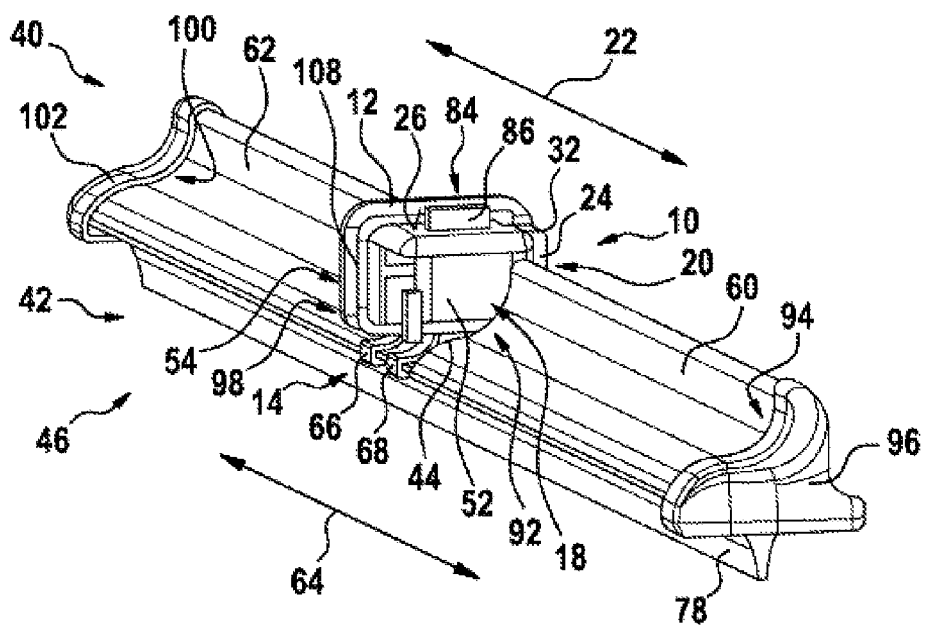
FIG. 1 shows a perspective view of a side of a wiper blade according to the invention, which side faces a wiper blade main approach flow side, with a wiper connecting unit according to the invention in a schematic illustration.
Figure 4:
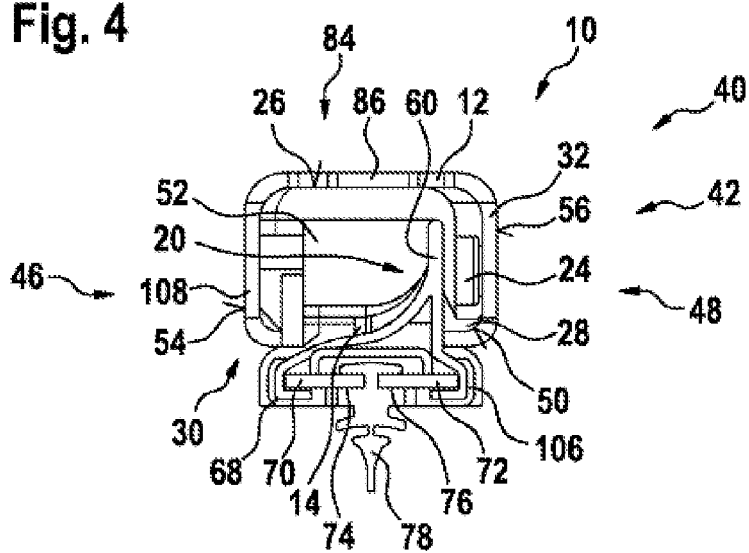
FIG. 4 is a view of the wiper blade according to the invention on one wiper arm side of the wiper connecting unit according to the invention in a schematic illustration.

FIG. 1 shows a wiper blade 40 for a wiper which has a spoiler unit 42, a wiper blade adaptor 14, which is arranged in a recess 44 of the spoiler unit 42, and a wiper connecting unit 10. The spoiler unit 42 comprises a first spoiler element 60 and a second spoiler element 62 which are spaced apart from each other along a longitudinal direction 64 of the wiper blade 40. An extension of the recess 44 along the longitudinal direction 64 of the wiper blade 40 is formed by a spacing of the first spoiler element 60 relative to the second spoiler element 62. The wiper blade adapter 14 is connected to spring rails 70, 72 of the wiper blade 40 by means of hook-shaped fastening elements 66, 68, 104, 106. However, it is also conceivable that the wiper blade adapter 14 is connected to the spring rails 70, 72 by means of a different type of connection known to a person skilled in the art, such as, for example, by means of a welded connection. The spring rails 70, 72 are arranged in grooves 74, 76 of a wiper blade rubber 78 of the wiper blade 40 (FIG. 4). The spring rails 70, 72 are held in the grooves 74, 76 by means of the hook-shaped fastening elements 66, 68, 104, 106 of the wiper blade adapter 14. The wiper blade adapter 14 is therefore fastened to the wiper blade rubber 78 of the wiper blade 40 by the connection of the hook-shaped fastening elements 66, 68, 104, 106 and the spring rails 70, 72.

Figure 6:
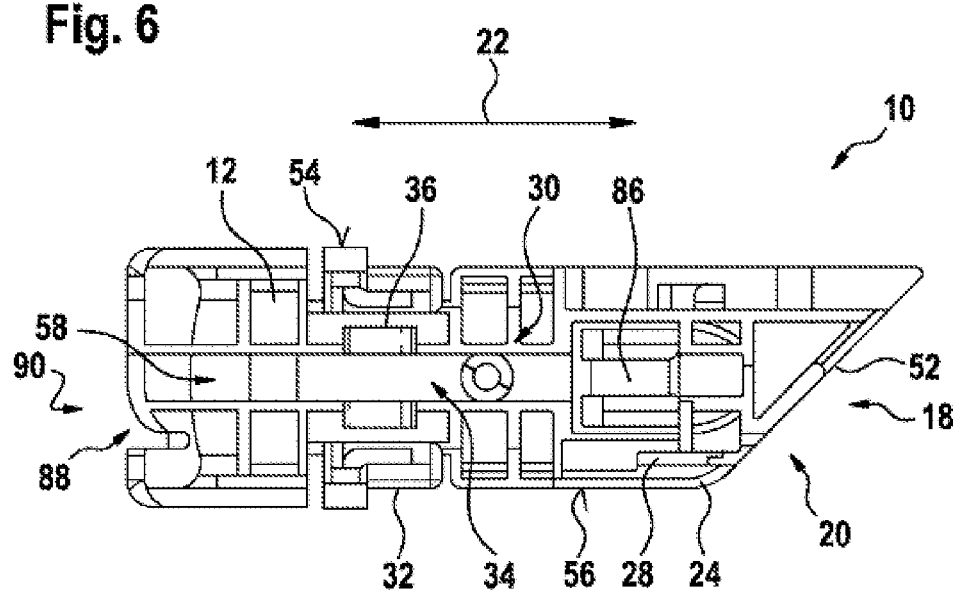
FIG. 6 shows a view of the wiper connecting unit according to the invention from a side of the wiper connecting unit, which, in a fitted state, faces the wiper blade, in a schematic illustration.

The wiper connecting unit 10 has a basic body 12 for connecting the wiper blade adapter 14 to a wiper arm 16 of the wiper. The basic body 12 of the wiper connecting unit 10 has a receiving region 58 for the wiper blade adapter 14 (FIG. 6). In a fitted state of the basic body 12, the wiper blade adapter 14 is arranged in an inner region 34 of the basic body 12 of the wiper connecting unit 10.

Figure 3:
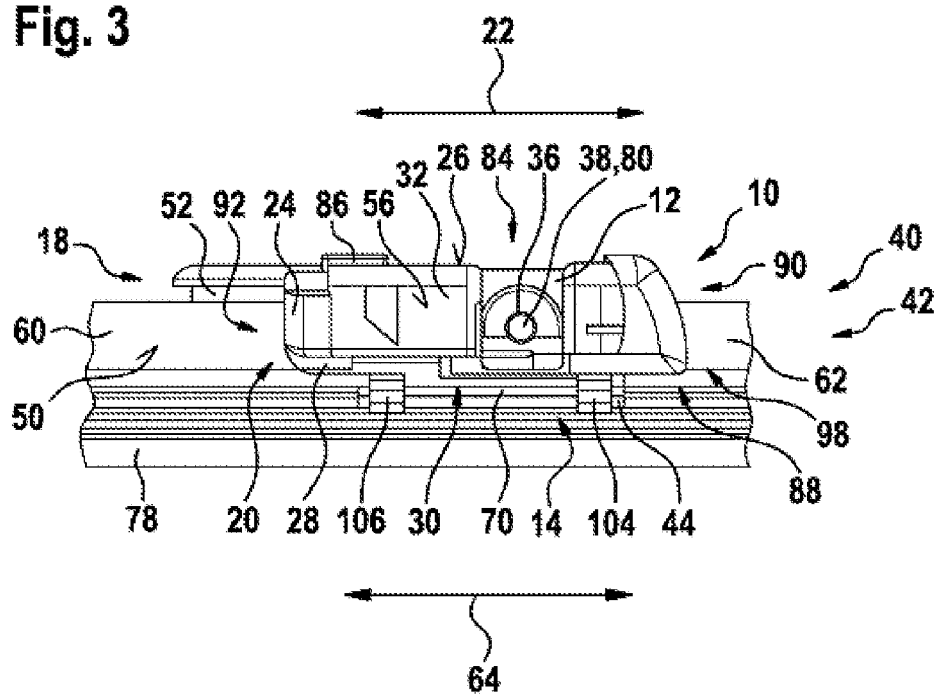
FIG. 3 shows a view of that side of a detail of the wiper blade according to the invention which faces away from the wiper blade main approach flow side with the wiper connecting unit according to the invention in a schematic illustration.

Furthermore, the basic body 12 has a spoiler receiving region 20 arranged on one wiper arm side 18. In a fitted state of the wiper connecting unit 10, the first spoiler element 60 of the spoiler unit 42 extends with a first end 92 along the longitudinal direction 64 of the wiper blade 40 into the spoiler receiving region 20. In this case, the first end 92 of the first spoiler element 60 is surrounded in a plane running perpendicularly to the longitudinal direction 64 of the wiper blade 40 by three sides of the basic body 12. An end cap 96 is arranged at an end 94 of the first spoiler element 60, which end faces away from the end 92 extending into the spoiler receiving region 20. Furthermore, the basic body 12 has a further spoiler receiving region 88 which is arranged on a side 90 of the basic body 12, which side is opposite the wiper arm side 18 (FIG. 3). In this case, in a fitted state of the wiper connecting unit 10, the second spoiler element 62 of the spoiler unit 42 extends with a first end 98 along the longitudinal axis 64 of the wiper blade 40 into the further spoiler receiving region 88. The first end 98 of the second spoiler element 62 is surrounded here in a plane running perpendicularly to the longitudinal direction 64 of the wiper blade 40 by three sides of the basic body 12. A further end cap 102 is arranged at an end 100 of the second spoiler element 62, which end faces away from the end 98 extending into the further spoiler receiving region 88.

The basic body 12 furthermore has a bearing receptacle 36 which is provided for receiving a bearing element 38 for the pivotable mounting of the basic body 12 relative to the wiper blade adapter 14. The bearing element 38 is designed as a bolt 80. The bolt 80 connects the basic body 12 pivotably to the wiper blade adapter 14 such that a pivoting movement between the basic body 12 and the wiper blade adapter 14 can be permitted (FIG. 3).

Figure 2:
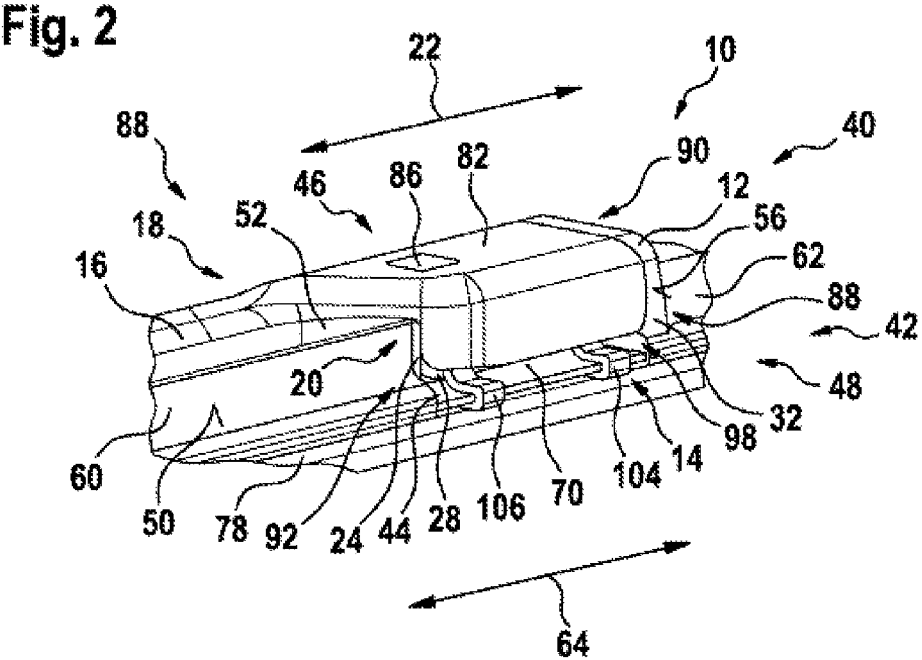
FIG. 2 shows a perspective view of that side of a detail of the wiper blade according to the invention which faces away from the wiper blade main approach flow side with the wiper connecting unit according to the invention coupled to a joining element of a wiper arm.
Figure 5:
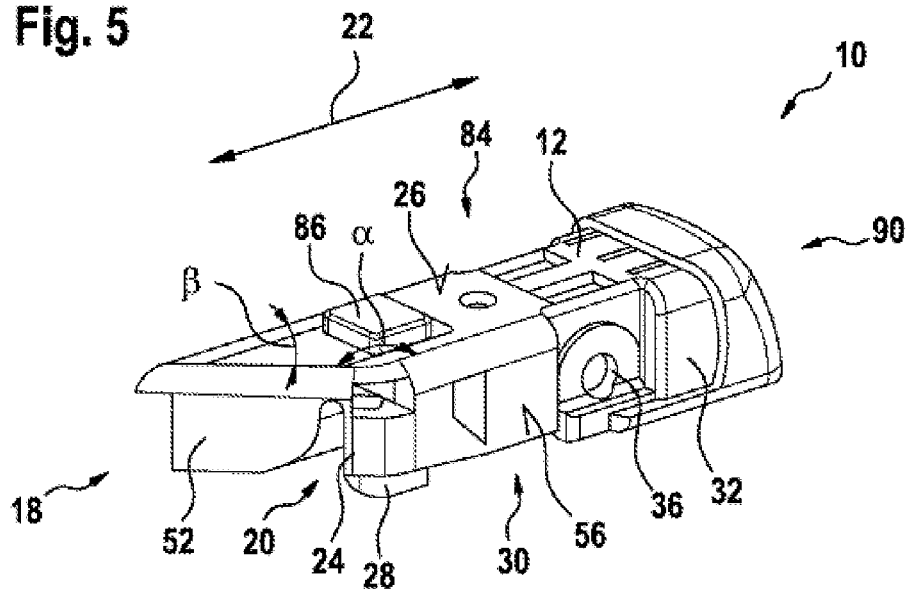
FIG. 5 shows a perspective detailed view of the wiper connecting unit according to the invention in a schematic illustration.

FIG. 2 shows a side 48 of the wiper blade 40, which side faces away from a wiper blade main approach flow side 46, with the wiper connecting unit 10 coupled to a joining element 82 of the wiper arm 16. For coupling to the basic body 12, the joining element 82 is pushed along a longitudinal direction 22 of the basic body 12 onto a coupling region 84 of the basic body 12. The coupling region 84 has a form-fitting element 86 which, for the form-fitting connection to the joining element 82, latches releasably into a recess of the joining element 82. The form-fitting element 86 is integrally formed in an elastically movable manner on a top side 26 of the basic body 12 (FIG. 5). The joining element 82 and the wiper connecting unit 10 are coupled and decoupled in a manner known to a person skilled in the art, and therefore this is not discussed in more detail here.

FIG. 3 shows the wiper blade 40 with the wiper connecting unit 10 from that side 48 of the wiper blade 40 which faces away from the wiper blade main approach flow side 46. The basic body 12 of the wiper connecting unit 10 overlaps that side 48 of the spoiler unit 42 which faces away from the wiper blade main approach flow side 46, on the wiper arm side 18 of the basic body 12. The basic body 12 here has a first fluid-retaining element 24 which is adjacent to the spoiler receiving region 20 transversely with respect to the longitudinal direction 22 of the basic body 12. The first fluid-retaining element 24 is of curved design starting from the spoiler receiving region 20, as viewed from the top side 26 of the basic body 12. The first fluid-retaining element 24 extends from the spoiler receiving region 20 into a side wall 32 of the basic body 12. The side wall 32 is formed integrally with the first fluid-retaining element 24. The first fluid-retaining element 24 therefore forms a transition of the wiper arm side 18 into a side 56 of the basic body 12, which side faces away from the wiper blade main approach flow side 46. Furthermore, the first fluid-retaining element 24 forms a transition from the spoiler receiving region 20 into the side wall 32 of the basic body 12. The first fluid-retaining element 24 overlaps the spoiler unit 42 along the longitudinal direction 64 of the wiper blade 40 on the wiper arm side 18 of the basic body 12. By means of the overlapping of the spoiler unit 42 on that side 48 of the wiper blade 40 which faces away from the wiper blade main approach flow side 46 on the wiper arm side 18 of the basic body 12 by means of the first fluid-retaining element 24, a fluid flow, such as, for example, a flow of water, from the wiper blade main approach flow side 46 to that side 48 of the wiper blade 40 which faces away from the wiper blade main approach flow side 46 can be substantially avoided.

Furthermore, the basic body 12 has a second fluid-retaining element 28 which adjoins the first fluid-retaining element 24, is arranged on a side 30 facing away from the top side 28 of the basic body 12 and extends with a component, which extends perpendicularly to the side wall 32, into the inner region 34 of the basic body 12 (FIGS. 4 and 6). By means of the extension of the second fluid-retaining element 28 into the inner region 34 of the basic body 12, an intermediate space between a side 50 of the spoiler unit 42 which side faces away from the wiper blade main approach flow side 46, and the wiper connecting unit 10 is closed such that a fluid flow, such as, for example, a flow of water, from the wiper blade main approach flow side 46 to that side 48 of the wiper blade 40 which faces away from the wiper blade main approach flow side 46 can be substantially avoided by the wiper connecting unit 10. The first fluid-retaining element 24 is formed integrally with the second fluid-retaining element 28. The first fluid-retaining element 24 and the second fluid-retaining element 28 each overlap the spoiler unit 42 on the wiper arm side 18.

FIG. 4 shows a view of the wiper arm side 18 of the wiper connecting unit 10, wherein the end cap 96 is removed from that end 94 of the first spoiler element 60 which faces away from the end 92 extending into the spoiler receiving region 20. The first fluid-retaining element 24 and the second fluid-retaining element 28 bear in a sealing manner against that side 50 of the spoiler unit 42 which faces away from the wiper blade main approach flow side 46. By means of the spoiler unit 42 being approached by a fluid flow, such as, for example, relative wind, that side 50 of the spoiler unit 42 which faces away from the wiper blade main approach flow side 46 is pressed against the first fluid-retaining element 24 and the second fluid-retaining element 28 in a direction transversely with respect to the longitudinal direction 64 of the wiper blade 40. Pressing on of that side 50 of the spoiler unit 42 which faces away from the wiper blade main approach flow side 46 causes a sealing effect between that side 50 of the spoiler unit 42 which faces away from the wiper blade main approach flow side 46 and the first fluid-retaining element 24 and the second fluid-retaining element 28. The first fluid-retaining element 24 and the second fluid-retaining element 28 cover the spoiler unit 42, as viewed from that side 48 of the wiper blade 40 which faces away from the wiper blade main approach flow side 46, on the wiper arm side 18 of the basic body 12 in a plane perpendicular to the longitudinal direction 22 of the basic body 12. The basic body 12 furthermore covers the spoiler unit 42, as viewed from that side 48 of the wiper blade 40 which faces away from the wiper blade main approach flow side 46, on that side 90 of the basic body 12 which is opposite the wiper arm side 18. An extension of the basic body 12 along the longitudinal direction 22 of the basic body 12 is greater than an extension of the recess 44 along the longitudinal direction 64 of the wiper blade 40. The basic body 12 therefore covers the spoiler unit 42 on that side 48 of the wiper blade 40 which faces away from the wiper blade main approach flow side 46 on the wiper arm side 18 and on that side 48 of the wiper blade 40 which faces away from the wiper blade main approach flow side 46 on that side 90 of the basic body 12 which is opposite the wiper arm side 18.

Furthermore, the basic body 12 has a third fluid-retaining element 52 which, as viewed from the top side 26 of the basic body 12, encloses an angle α unequal to 90° to the side wall 32 of the basic body 12. The third fluid-retaining element 52 and the side wall 32 of the basic body 12 enclose the angle α of approximately 135°. A side wall 108 of the basic body 12, which side wall is arranged on that side 54 of the basic body 12 which faces the wiper blade main approach flow side 46, encloses an angle β of approximately 45° with the third fluid-retaining element 52. That side wall 108 of the basic body 12 which is arranged on the side 54 facing the wiper blade main approach flow side 46 has a greater extension along the longitudinal direction 22 of the basic body 12 than that side wall 32 of the basic body 12 which is arranged on that side 54 of the basic body 12 which faces away from the wiper blade main approach flow side 46.

By means of the third fluid-retaining element 52, penetration of a fluid flow, such as, for example, a flow of water, along the longitudinal direction 64 of the wiper blade 40 into the basic body 12 is limited. An interaction of the first fluid-retaining element 24, the second fluid-retaining element 28 and the third fluid-retaining element 52 causes an interruption of a fluid flow, such as, for example, a flow of water, along the longitudinal direction 64 of the wiper blade 40 such that escape of water on that side 48 of the wiper blade 40 which faces away from the wiper blade main approach flow side 46 can be substantially prevented.

What is claimed is:

1. A wiper connecting unit with a basic body (12) configured to connect a wiper blade adapter (14) to a wiper arm (16) of a wiper, characterized in that the basic body (12) extends along a longitudinal direction (22) and has a top side (26) configured to face away from the wiper blade adapter (14) when the basic body (12) is connected to the wiper blade adapter (14), a bottom side (30) disposed opposite and facing away from the top side (26), a first end (18) that has a spoiler receiving region (20) to receive a portion of a spoiler element (60) along the longitudinal direction (22), a second, opposite end (90) spaced from the first end (18) along the longitudinal direction (22), a first side wall (32) disposed between the first and second ends (18, 90) and between the top side (26) and bottom side (30), and a second side wall disposed between the first and second ends and between the top side (26) and the bottom side (30), the second side wall disposed opposite the first side wall (32), wherein the basic body (12) further includes a fluid-retaining element (52) along the first end (18) that includes a wall that is angled relative to the longitudinal direction (22) at an oblique angle, wherein the wall of the fluid retaining element (52) extends at least substantially an entire distance between the first side wall (32) and the second side wall, and wherein the spoiler receiving region (20) includes an opening on the wall of the fluid retaining element (52).

2. The wiper connecting unit according to claim 1, characterized in that the fluid-retaining element (52) is a first fluid-retaining element, and wherein the basic body (12) has a second fluid-retaining element (24) which is at least partially adjacent to the spoiler receiving region (20) transversely with respect to the longitudinal direction (22) of the basic body (12), wherein the wall of the first fluid retaining element (52) extends from the first side wall (32) to the second fluid-retaining element (24).

3. The wiper connecting unit according to claim 2, characterized in that the second fluid-retaining element (24) is of curved design starting from the spoiler receiving region (20), as viewed from the top side (26) of the basic body (12) looking toward the bottom side (30).

4. The wiper connecting unit at least according to claim 2, characterized in that the basic body (12) has a third fluid-retaining element (28) which adjoins the second fluid-retaining element (24), is arranged on the bottom side (30) and extends with at least one component, which extends perpendicularly to the first side wall (32), into an inner region (34) of the basic body (12).

5. The wiper connecting unit according to claim 4, characterized in that the second fluid-retaining element (24) is at least partially formed integrally with the third fluid-retaining element (28).

6. The wiper connecting unit according to claim 1, characterized in that the basic body (12) has a bearing receptacle (36) which is configured to receive a bearing element (38) for pivotable mounting of the basic body (12) relative to the wiper blade adapter (14).

7. A wiper blade with at least one spoiler unit (42), with a wiper blade adapter (14) which is at least partially arranged in a recess (44) of the spoiler unit (42), and with the wiper connecting unit (10) of claim 1, characterized in that the wiper connecting unit (10) overlaps a side (48) of the spoiler unit (42) that faces away from a wiper blade main approach flow side (46), as viewed in an operating state, at least on the first end (18) of the basic body (12).

8. The wiper blade according to claim 7, characterized in that the fluid-retaining element (52) is a first fluid-retaining element, and that a second fluid-retaining element (24) and a third fluid-retaining element (28) of the basic body (12) of the wiper connecting unit (10) at least partially overlap the spoiler unit (42) on the first side (18).

9. The wiper blade according to claim 7, characterized in that the fluid-retaining element (52) is a first fluid-retaining element, and that a second fluid-retaining element (24) and a third fluid-retaining element (28) of the basic body (12) of the wiper connecting unit (10) bear in an at least partially sealing manner against a side (50) of the spoiler unit (42) which faces away from the wiper blade main approach flow side (46).

10. The wiper blade according to claim 1, wherein the wall of the fluid retaining element (52) is angled relative to the longitudinal direction (22) at an angle of approximately 135 degrees.

11. The wiper blade according to claim 1, wherein the wall of the fluid retaining element (52) extends greater than half of the distance between the first side wall (32) and the second side wall.

12. The wiper blade according to claim 11, wherein the distance between the first side wall (32) and the second side wall is taken along a direction that is perpendicular to both the first side wall (32) and the second side wall.

13. The wiper blade according to claim 1, wherein the wall of the fluid retaining element (52) is planar.

14. The wiper blade according to claim 1, wherein the wall of the fluid retaining element (52) extends vertically along a direction perpendicular to the longitudinal direction (22).

15. The wiper blade according to claim 1, wherein the first side wall (32) extends a shorter distance along the longitudinal direction (22) than the second side wall.

* * * * *